US 11,299,875 B2

(12) United States Patent
Boye (10) Patent No.: US 11,299,875 B2
(45) Date of Patent: Apr. 12, 2022

(54) FAUCET ACTUATOR TORQUE INCREASING SYSTEM AND METHOD (71) Applicant: Chris Boye, Cape Coral, FL (US)

(72) Inventor: Chris Boye, Cape Coral, FL (US)

(*) Notice: Subject to any disclaimer, the term of this patent is extended or adjusted under 35 U.S.C. 154(b) by 114 days.

(21) Appl. No.: 16/788,431

(22) Filed: Feb. 12, 2020

(65) Prior Publication Data
US 2021/0246639 A1 Aug. 12, 2021

(51) Int. Cl.
E03C 1/04 (2006.01)
F16K 31/60 (2006.01)
A47K 3/28 (2006.01)
F16K 35/02 (2006.01)
B25B 13/28 (2006.01)
B25B 13/34 (2006.01)
B25B 13/30 (2006.01)

(52) U.S. Cl.
CPC ............ *E03C 1/0412* (2013.01); *F16K 31/60* (2013.01); *F16K 31/602* (2013.01); *F16K 31/605* (2013.01); *A47K 3/281* (2013.01); *B25B 13/28* (2013.01); *B25B 13/30* (2013.01); *B25B 13/34* (2013.01); *F16K 35/027* (2013.01)

(58) Field of Classification Search
CPC ...... F16K 31/60; F16K 31/602; F16K 31/605; F16K 31/607; F16K 35/027; E03C 1/0409; E03C 1/0412; B25B 13/28; B25B 13/30; B25B 13/34; A47K 3/281
USPC ................................................. 251/292, 293
See application file for complete search history.

(56) References Cited

U.S. PATENT DOCUMENTS

| 28,588 | A | * | 6/1860 | Leach | F16K 5/025 251/181 |
| 563,193 | A | * | 6/1896 | Leach | B25B 13/08 81/119 |
| 1,387,715 | A | * | 8/1921 | George | F16K 31/44 251/90 |
| 3,656,793 | A | | 4/1972 | Mathews | |
| 4,285,536 | A | | 8/1981 | McCoy | |
| 4,562,758 | A | * | 1/1986 | Stirling | B25B 13/50 81/124.2 |
| 5,220,697 | A | * | 6/1993 | Birchfield | A47K 3/281 4/559 |
| 5,557,955 | A | * | 9/1996 | Kinsella | E03C 1/041 70/177 |

(Continued)

FOREIGN PATENT DOCUMENTS

WO WO2013163485 10/2013

*Primary Examiner* — Matthew W Jellett (57) ABSTRACT

A faucet actuator torque increasing system and method for increasing torque applied to an actuator includes a grip. The grip has a perimeter wall with a continuous convexly arcuate shape. A coupler is removably mounted on the perimeter wall of the grip. The coupler includes a first segment and a second segment which are pivotably coupled to each other via a connector. The first and second segments move between a closed condition engaging the grip and an open condition for disengaging the grip. Each of the first and second segments has an interior surface. The interior surfaces abut the grip in the closed condition. A locking member releasably locks the coupler in the closed condition. A handle is integrally attached to and extends away from the coupler. A stop is attached to the coupler to abut against the grip when in the closed condition.

11 Claims, 5 Drawing Sheets (56) References Cited

U.S. PATENT DOCUMENTS

| | | | |
|---|---|---|---|
| 6,186,475 B1 * | 2/2001 | Selepouchin | F16K 31/46 16/427 |
| 6,457,208 B1 | 10/2002 | Keith | |
| 6,783,113 B2 * | 8/2004 | Schommer | F16K 31/602 137/556 |
| 8,746,656 B2 * | 6/2014 | Huang | F16K 31/607 251/292 |
| 9,268,355 B2 * | 2/2016 | Lee | F16K 31/60 |
| 9,415,487 B2 * | 8/2016 | Wilson | B25B 13/08 |
| 10,071,466 B2 * | 9/2018 | Wilson | B25B 13/04 |

* cited by examiner

FAUCET ACTUATOR TORQUE INCREASING SYSTEM AND METHOD

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to torque increasing systems and methods and more particularly pertains to a new torque increasing system and method for increasing torque applied to an actuator. The disclosure provides additional leverage and a handle to improve grip for persons having dexterity limitations.

(2) Description of Related Art Including Information Disclosed Under 37 CFR 1.97 and 1.98

The prior art relates to torque increasing systems and methods.

BRIEF SUMMARY OF THE INVENTION

An embodiment of the disclosure meets the needs presented above by generally comprising a grip. The grip has a perimeter wall with a continuous convexly arcuate shape. A coupler is removably mounted on the grip such that the coupler extends around the perimeter wall. The coupler includes a first segment and a second segment which are pivotably coupled to each other. The first segment and the second segment are movable between a closed condition abutting and frictionally engaging the grip and an open condition wherein the coupler is removable from the grip. Each of the first segment and the second segment has a top surface, a bottom surface, a first end, a second end, an interior surface and an exterior surface. The interior surfaces of the first and second segments abut the grip in the closed condition. The coupler includes a connector. The connector is attached to the second ends of the first and second segments to pivotably couple the first and second segments together. A locking member is attached to the first ends of the first and second segments to releasably lock the coupler in the closed condition and in frictional engagement with the grip. A handle is integrally attached to and extends away from the coupler. A stop is attached to the coupler. The stop abuts against an outer end of the grip when the coupler is mounted on the grip.

A method of using the system disclosed above generally comprises positioning a coupler on a grip and abutting a stop attached to the coupler against an outer end of the grip to reduce a distance of movement of the coupler toward a wall on which the grip is mounted. The grip has a perimeter wall with a continuous convexly arcuate shape. The grip is rotated to open or close a flow of water to a faucet. The coupler extends around the perimeter wall. The coupler includes a first segment and a second segment which are pivotably coupled to each other and are movable between a closed condition abutting and frictionally engaging the grip and an open condition is removable from the grip. Each of the first segment and the second segment has a top surface, a bottom surface, a first end, a second end, an interior surface and an exterior surface. The interior surfaces of the first and second segments abut the grip in the closed condition. The interior surface of each of the first and second segments are convexly arcuate such that an annular shape is defined when the coupler is in the closed condition. Securing a locking member on the coupler to retain frictional engagement of the coupler with the grip. Rotating a handle attached to the coupler to rotate the grip. The handle has a length between 3.00 and 12.00 inches.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 5 thereof, a new torque increasing system and method embodying the principles and concepts of an embodiment of the disclosure and generally designated by the reference numeral 10 will be described.

As best illustrated in FIGS. 1 through 5, the faucet actuator torque increasing system and method 10 generally comprises a grip 12. The grip 12 has a perimeter wall 14 with a continuous convexly arcuate shape. The grip 12 is rotated to open or close a flow of water to a faucet 16. The faucet 16 may be a shower head. The grip 12 may have indentions into the perimeter wall 14 to aid when grabbed. The continuous convexly arcuate shape may include oval or round shapes. The grip 12 does not include an integral handle portion protruding more than 2.00 inches in at least one direction perpendicular to an axis of rotation of the grip 12.

A coupler 18 is removably mounted on the grip 12 such that the coupler 18 extends around the perimeter wall 14. The coupler 18 includes a first segment 20 and a second segment 22 which are pivotably coupled to each other. The first segment 20 and the second segment 22 are movable between a closed condition 24 abutting and frictionally engaging the grip 12 and an open condition 26 wherein the coupler 18 is removable from the grip 12. Each of the first segment 20 and the second segment 22 has a top surface 28, a bottom surface 30, a first end 32, a second end 34, an interior surface 36 and an exterior surface 38. The interior surfaces 36 of the first segment 20 and the second segment 22 abut the grip 12 in the closed condition 24. The interior surfaces 36 of each of the first segment 20 and second segment 22 are convexly arcuate such that an annular shape is defined when the coupler 18 is in the closed condition 24. The interior surfaces 36 of the first segment 20 and the second segment 22 each has a plurality of notches 40 extending therein.

The coupler 18 further includes a connector 42 which is attached to the second ends 34 of the first segment 20 and the second segment 22 to pivotably couple the first segment 20 and the second segment 24 together. An embodiment of the invention may use a pin 52 to pivotably couple the connector together. A locking member 44 is attached to the first ends 32 of the first segment 20 and the second segment 22. The locking member 44 releasably locks the coupler 18 in the closed condition 24 and in frictional engagement with the grip 12. The locking member 44 further includes a pair of tabs 46. Each of the first ends 32 has one of the tabs 46 attached thereto. A fastener 48 extends through each of the tabs 46. A retention member 50 releasably engages the fastener 48 and biases the tabs 46 toward each other.

A handle 54 is integrally attached to and extends away from the coupler 18. The handle 54 has a length between 3.00 and 12.00 inches. The handle 54 forms a unitary structure with one of the tabs 46. The handle 54 may include texture or grooves to improve operability by improving traction when grabbing the handle 54.

A stop 56 is attached to the coupler 18. The stop 56 abuts against an outer end 58 of the grip 12 when the coupler 18 is mounted on the grip 12. The stop 56 reduces a distance of movement of the coupler 18 toward a wall 60 on which the grip 12 is mounted. The stop 56 includes an arm 62 extending away from the top surface 28 of the coupler 18. A leg 64 is attached to the arm 62 and extends over an area 66 bounded by the coupler 18 in the closed condition 24. The leg 64 abuts the outer end 58 when the grip 12 is extended through the coupler 18.

The method of using the system disclosed above comprises positioning a coupler 18 on a grip 12 and abutting a stop 56 attached to the coupler 18 against an outer end 58 of the grip 12 to reduce a distance of movement of the coupler 18 toward a wall 60 on which the grip 12 is mounted. The grip 12 has a perimeter wall 14 with a continuous convexly arcuate shape. The grip 12 is rotated to open or close a flow of water to a faucet 16. The coupler 18 extends around the perimeter wall 14. The coupler 18 includes a first segment 20 and a second segment 22 which are pivotably coupled to each other. The first segment 20 and the second segment 22 are movable between a closed condition 24 abutting and frictionally engaging the grip 12 and an open condition 26 wherein the coupler 18 is removable from the grip 12. Each of the first segment 20 and the second segment 22 has a top surface 28, a bottom surface 30, a first end 32, a second end 34, an interior surface 36 and an exterior surface 38. The interior surfaces 36 of the first segment 20 and the second segment 22 abut the grip 12 in the closed condition 24. The interior surfaces 36 of each of the first segment 20 and the second segment 22 are convexly arcuate such that an annular shape is defined when the coupler 18 is in the closed condition 24.

Securing a locking member 44 on the coupler 18 to retain frictional engagement of the coupler 18 with the grip 12. The coupler 18 is secured using a fastener 48 and retention member 50.

Rotating a handle 54 attached to the coupler 18 to rotate the grip 12. The handle 54 has a length between 3.00 and 12.00 inches. The handle 54 forms a unitary body with the coupler 18.

Figure 1:
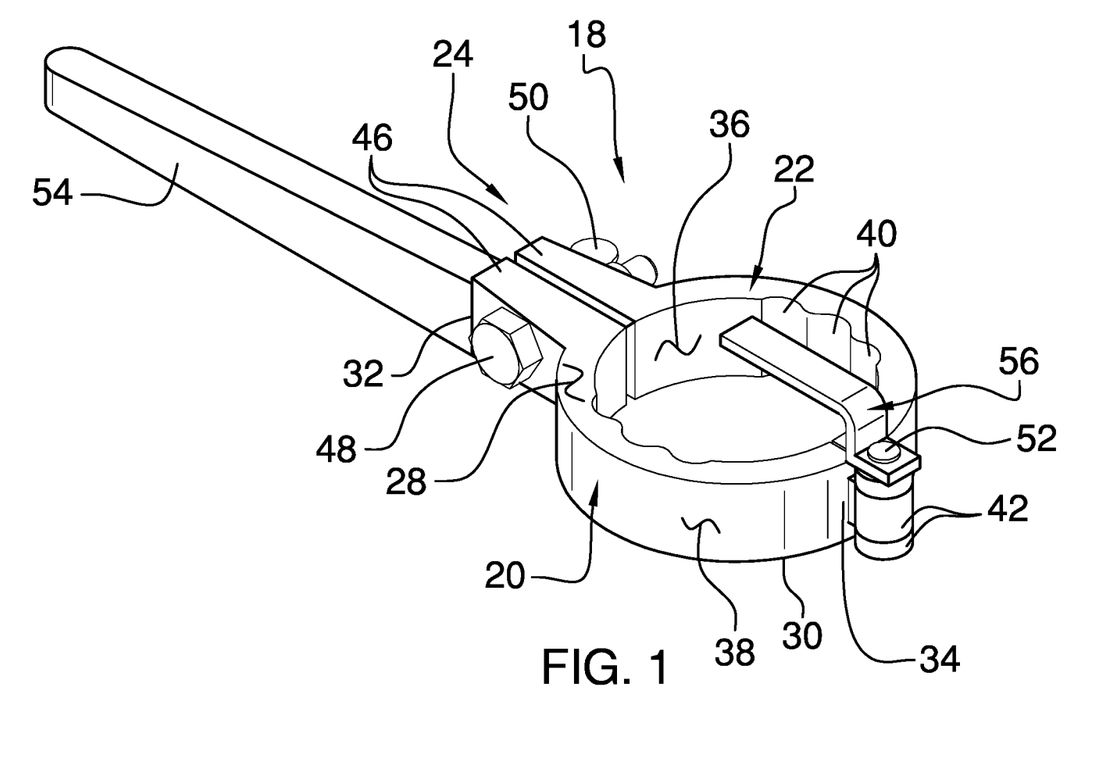
FIG. 1 is a top isometric view of a faucet actuator torque increasing system according to an embodiment of the disclosure.
Figure 2:
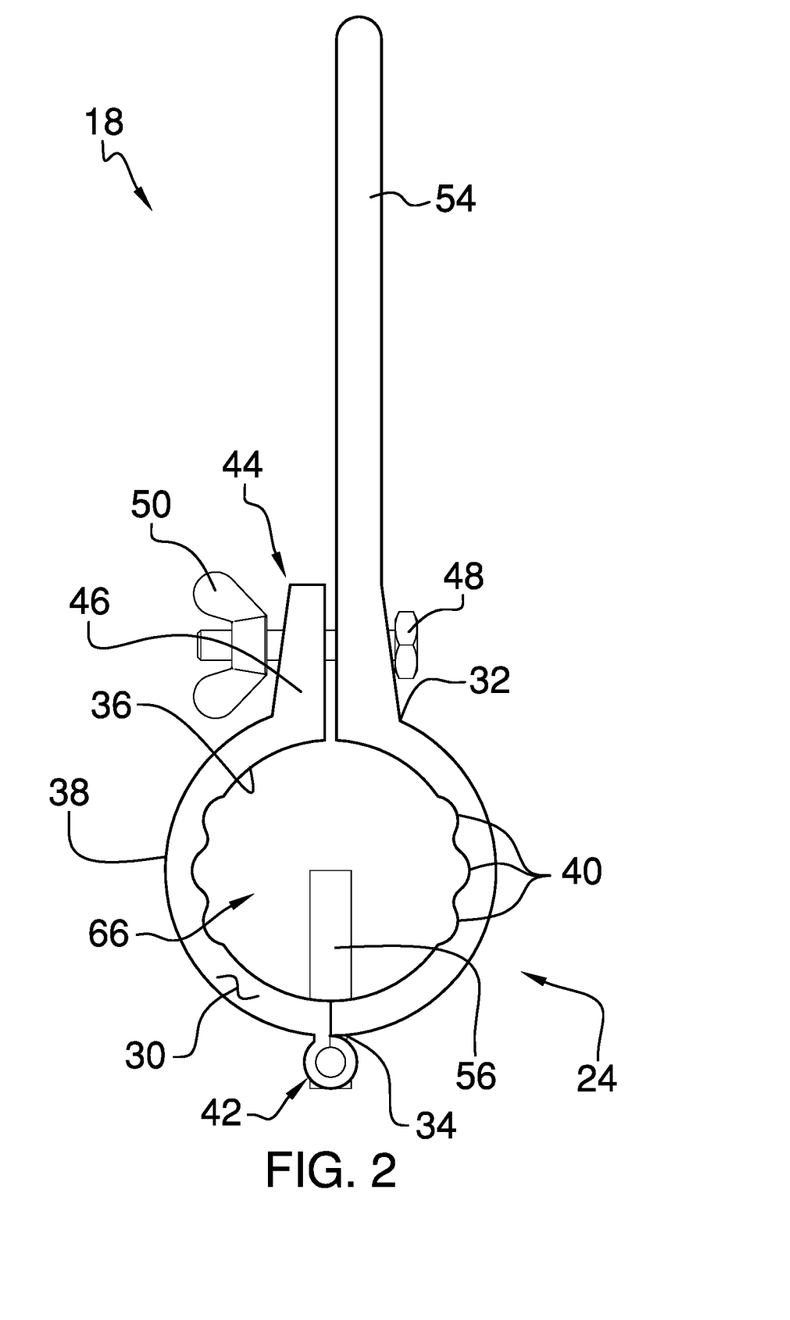
FIG. 2 is a bottom side view of an embodiment of the disclosure.
Figure 3:
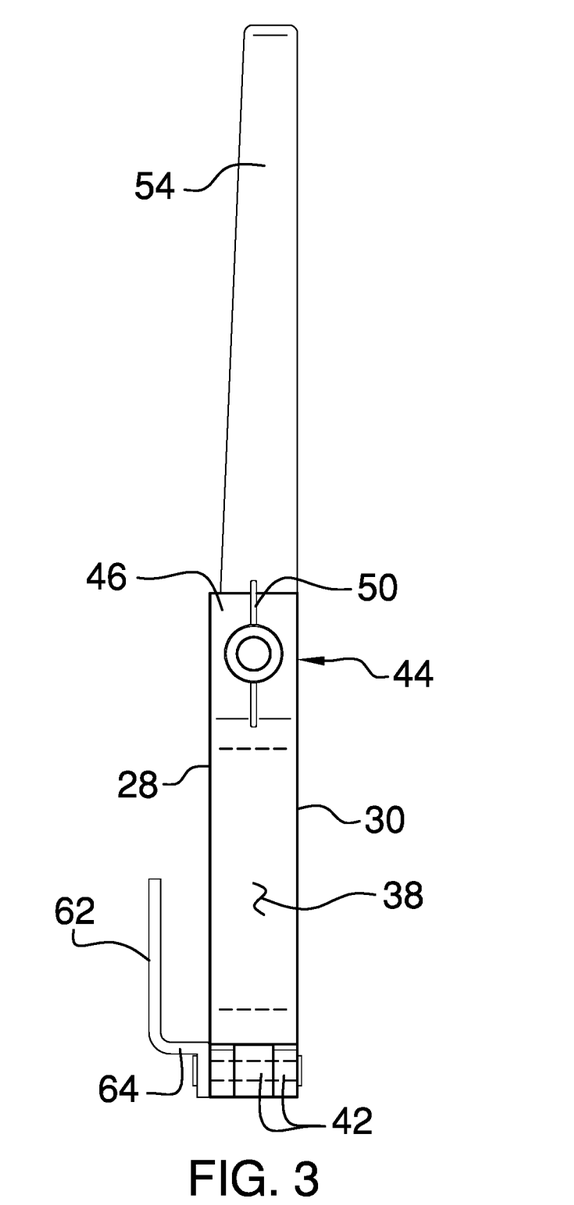
FIG. 3 is a side view of an embodiment of the disclosure.
Figure 4:
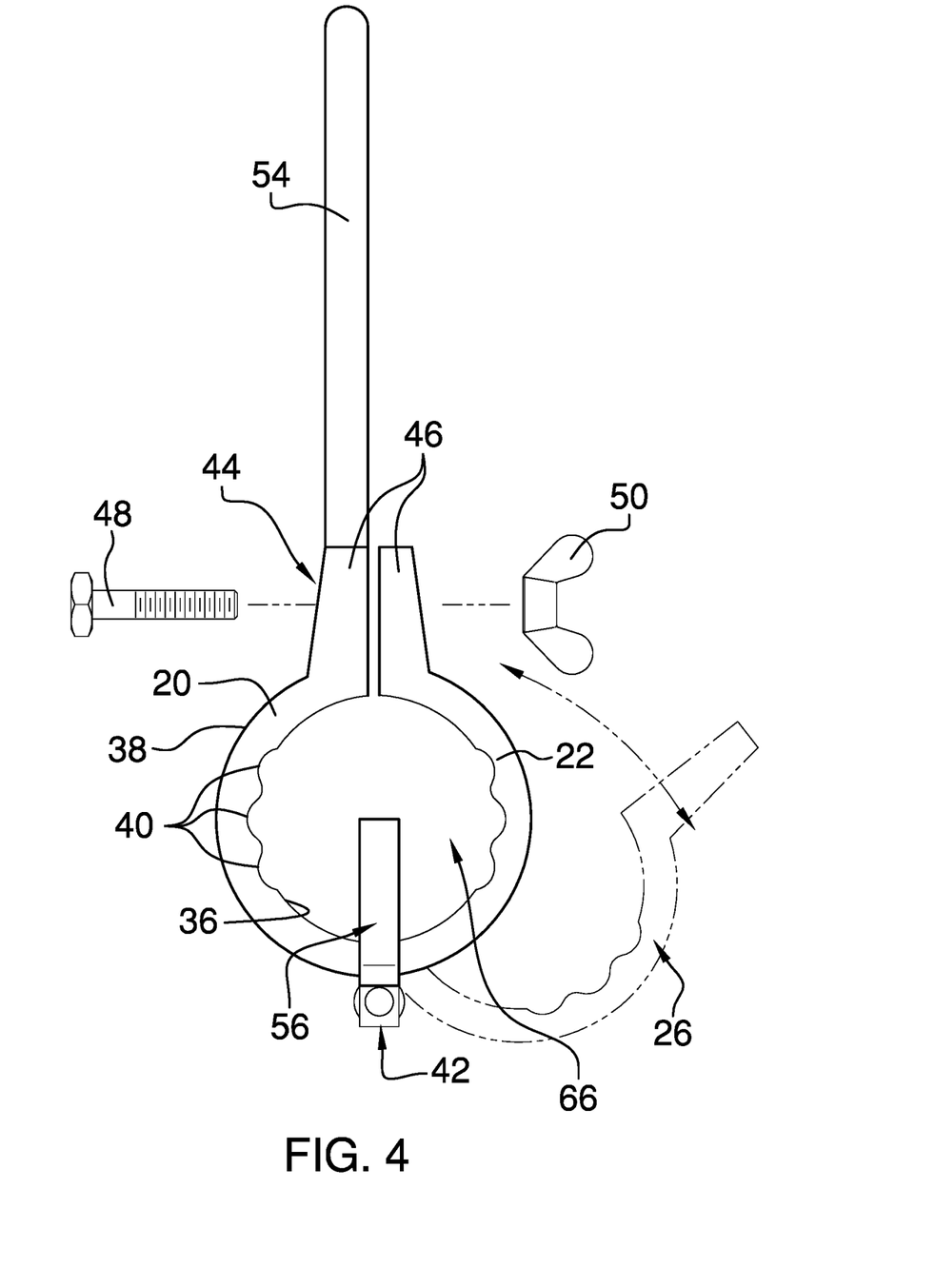
FIG. 4 is an exploded top view of an embodiment of the disclosure.
Figure 5:
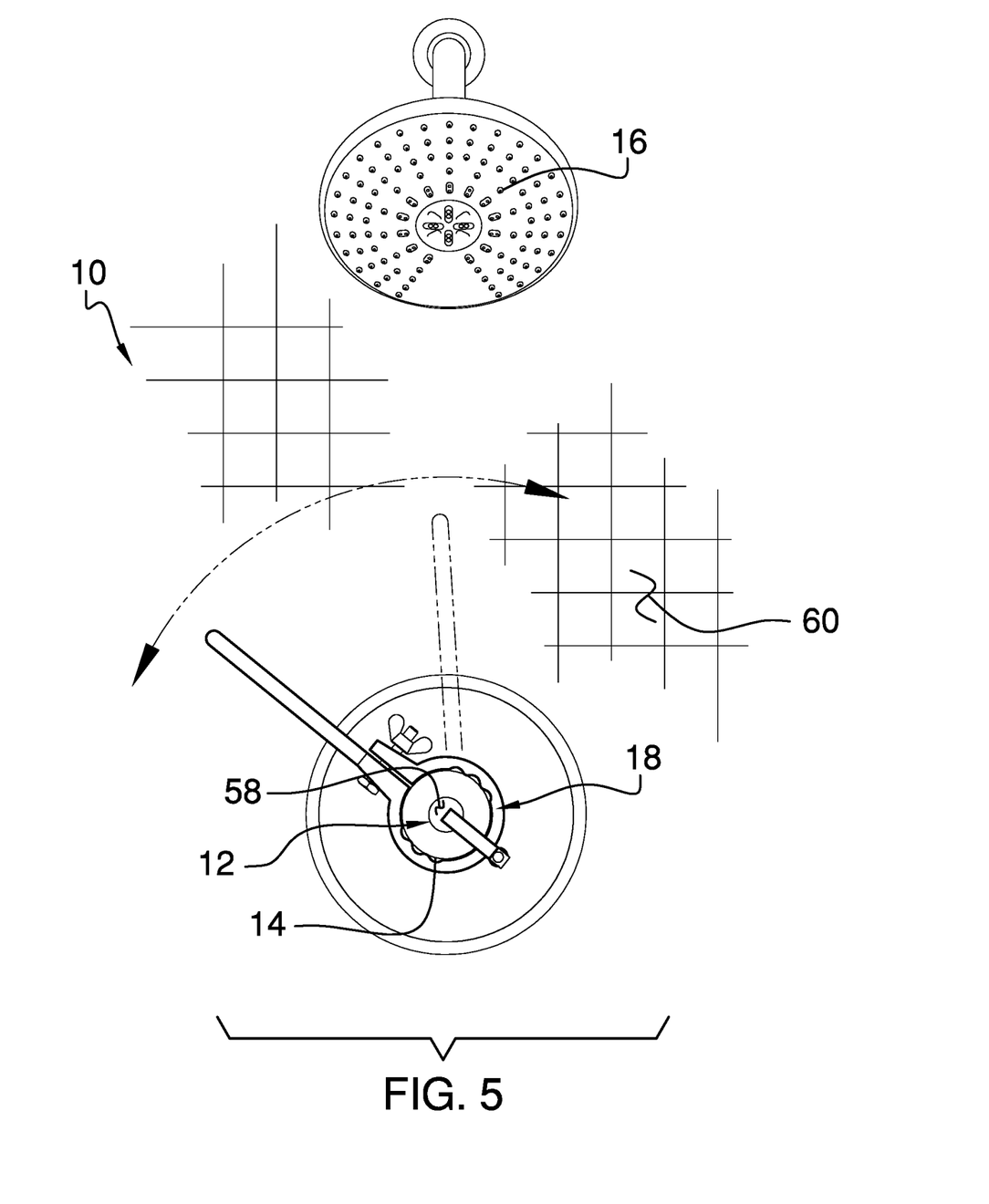
FIG. 5 is an in-use view of an embodiment of the disclosure.

In use, the coupler 18 is secured to the grip 12 with the stop 56 in contact with the outer end 58 of the grip 12. The locking member 44 is secured by a fastener 44 and retention member 44. The coupler 18 and grip 12 are rotated via torque applied to the handle 54 to actuate the faucet 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A faucet actuator torque increasing system configured to facilitate an ability to rotate a faucet actuator, said system comprising:
   a grip having a perimeter wall having a continuous convexly arcuate shape;
   a coupler being removably mounted on said grip such that said coupler extends around said perimeter wall, said coupler including a first segment and a second segment being pivotably coupled to each other and being movable between a closed condition abutting and frictionally engaging said grip and an open condition being removable from said grip, each of said first segment and said second segment having a top surface, a bottom surface, a first end, a second end, an interior surface and an exterior surface, said interior surfaces of said first and second segments abutting said grip in said closed condition, said coupler including:
   a connector being attached to said second ends of said first and second segments to pivotably couple said first and second segments together;
   a locking member being attached to said first ends of said first and second segments to releasably lock said coupler in said closed condition and in frictional engagement with said grip;
a handle being integrally attached to and extending away from said coupler;
a stop being attached to said coupler, said stop being abutted against an outer end of said grip when said coupler is mounted on said grip; and
wherein said locking member includes:
   a pair of tabs, each of said first ends having one of said tabs attached thereto;
   a fastener extending through each of said tabs; and
   a retention member releasably engaging said fastener and biasing said tabs toward each other.

2. The faucet actuator torque increasing system according to claim 1, wherein said grip is rotated to open or close a flow of water to a faucet.

3. The faucet actuator torque increasing system according to claim 1, wherein said interior surface of each of said first and second segments is convexly arcuate such that an annular shape is defined when said coupler is in said closed condition.

4. The faucet actuator torque increasing system according to claim 1, wherein said interior surfaces of said first and second segments each has a plurality of notches extending therein.

5. The faucet actuator torque increasing system according to claim 1, wherein said handle has a length between 3.00 and 12.00 inches.

6. The faucet actuator torque increasing system according to claim 1, wherein said handle forms a unitary structure with one of said tabs.

7. The faucet actuator torque increasing system according to claim 1, wherein said stop reduces a distance of movement of said coupler toward a wall on which said grip is mounted.

8. The faucet actuator torque increasing system according to claim 1, wherein said stop includes an arm extending away from said top surface of said coupler.

9. A faucet actuator torque increasing system configured to facilitate an ability to rotate a faucet actuator, said system comprising:
   a grip having a perimeter wall having a continuous convexly arcuate shape;
   a coupler being removably mounted on said grip such that said coupler extends around said perimeter wall, said coupler including a first segment and a second segment being pivotably coupled to each other and being movable between a closed condition abutting and frictionally engaging said grip and an open condition being removable from said grip, each of said first segment and said second segment having a top surface, a bottom surface, a first end, a second end, an interior surface and an exterior surface, said interior surfaces of said first and second segments abutting said grip in said closed condition, said coupler including:
      a connector being attached to said second ends of said first and second segments to pivotably couple said first and second segments together;
      a locking member being attached to said first ends of said first and second segments to releasably lock said coupler in said closed condition and in frictional engagement with said grip;
   a handle being integrally attached to and extending away from said coupler;
   a stop being attached to said coupler, said stop being abutted against an outer end of said grip when said coupler is mounted on said grip, wherein said stop includes an arm extending away from said top surface of said coupler; and
   wherein a leg is attached to said arm and extends over an area bounded by said coupler in said closed condition.

10. The faucet actuator torque increasing system according to claim 9, wherein said leg abuts said outer end when said grip is extended through said coupler.

11. A faucet actuator torque increasing system configured to facilitate an ability to rotate a faucet actuator, said system comprising:
   a grip having a perimeter wall having a continuous convexly arcuate shape, said grip being rotated to open or close a flow of water to a faucet;
   a coupler being removably mounted on said grip such that said coupler extends around said perimeter wall, said coupler including a first segment and a second segment being pivotably coupled to each other and being movable between a closed condition abutting and frictionally engaging said grip and an open condition being removable from said grip, each of said first segment and said second segment having a top surface, a bottom surface, a first end, a second end, an interior surface and an exterior surface, said interior surfaces of said first and second segments abutting said grip in said closed condition, said interior surface of each of said first and second segments being convexly arcuate such that an annular shape is defined when said coupler is in said closed condition, said interior surfaces of said first and second segments each having a plurality of notches extending therein, said coupler including:
      a connector being attached to said second ends of said first and second segments to pivotably couple said first and second segments together;
      a locking member being attached to said first ends of said first and second segments to releasably lock said coupler in said closed condition and in frictional engagement with said grip, said locking member including:
         a pair of tabs, each of said first ends having one of said tabs attached thereto;
         a fastener extending through each of said tabs;
         a retention member releasably engaging said fastener and biasing said tabs toward each other;
   a handle being integrally attached to and extending away from said coupler, said handle having a length between 3.00 and 12.00 inches, said handle forming a unitary structure with one of said tabs; and
   a stop being attached to said coupler, said stop being abutted against an outer end of said grip when said coupler is mounted on said grip, said stop reducing a distance of movement of said coupler toward a wall on which said grip is mounted, said stop including an arm extending away from said top surface of said coupler, a leg being attached to said arm and extending over an area bounded by said coupler in said closed condition, said leg abutting said outer end when said grip is extended through said coupler.

\* \* \* \* \*